US012015234B2

(12) United States Patent
Daoust et al.

(10) Patent No.: US 12,015,234 B2
(45) Date of Patent: Jun. 18, 2024

(54) COAXIAL CABLE CONNECTORS HAVING AN ANTI-BURST FEATURE

(71) Applicant: PPC BROADBAND, INC., East Syracuse, NY (US)

(72) Inventors: Daniel Daoust, Syracuse, NY (US); Steve Stankovski, Clay, NY (US); Harold Watkins, Chittenango, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/152,774

(22) Filed: Jan. 19, 2021

(65) Prior Publication Data

US 2021/0226356 A1 Jul. 22, 2021

Related U.S. Application Data

(60) Provisional application No. 62/962,283, filed on Jan. 17, 2020.

(51) Int. Cl.

| | |
|---|---|
| ***H01R 9/05*** | (2006.01) |
| ***H01R 13/622*** | (2006.01) |
| ***H01R 24/40*** | (2011.01) |

(52) U.S. Cl.

CPC ......... *H01R 9/0521* (2013.01); *H01R 13/622* (2013.01); *H01R 24/40* (2013.01)

(58) Field of Classification Search

CPC ..... H01R 9/0521; H01R 13/622; H01R 24/40

See application file for complete search history.

(56) References Cited

U.S. PATENT DOCUMENTS

| | | | | |
|---|---|---|---|---|
| 7,097,500 B2 * | 8/2006 | Montena | H01R 13/5219 | 439/587 |
| 7,618,276 B2 * | 11/2009 | Paglia | H01R 43/24 | 439/322 |
| 8,568,164 B2 * | 10/2013 | Ehret | H01R 24/54 | 439/578 |
| 2005/0029807 A1 | 2/2005 | Montena | | |
| 2006/0160417 A1 | 7/2006 | Montena | | |
| 2012/0196464 A1 | 8/2012 | Lu | | |

OTHER PUBLICATIONS

Search Report dated Mar. 30, 2021 in corresponding International Application No. PCT/US2021/014027, 3 pages.

Written Opinion dated Mar. 30, 2021 in corresponding International Application No. PCT/US2021/014027, 9 pages.

* cited by examiner

*Primary Examiner* — Briggitte R. Hammond

(74) *Attorney, Agent, or Firm* — MH2 TECHNOLOGY LAW GROUP LLP

(57) ABSTRACT

A coaxial cable connector includes a body configured to be coupled with a coaxial cable, a nut having a forward end configured to be threadedly coupled with an interface port, and a sleeve surrounding the nut and extending forward from the nut in a direction opposite to the body. The sleeve has a forward portion that extends beyond the forward end of the nut by a length such that the sleeve is configured to contact an outer surface of the interface port before a center conductor of the coaxial cable contacts the interface port, and the sleeve is configured to align the connector with the port and to prevent the center conductor from contacting any portion of the interface port other than a center conductor contact portion of the interface port.

33 Claims, 3 Drawing Sheets

COAXIAL CABLE CONNECTORS HAVING AN ANTI-BURST FEATURE

CROSS-REFERENCE TO RELATED APPLICATION

This application claims the benefit of U.S. Provisional Application No. 62/962,283, filed Jan. 17, 2020, the disclosure of which is hereby incorporated by reference herein in its entirety.

BACKGROUND

Broadband communications have become an increasingly prevalent form of electromagnetic information exchange and coaxial cables are common conduits for transmission of broadband communications. Coaxial cables are typically designed so that an electromagnetic field carrying communications signals exists only in the space between inner and outer coaxial conductors of the cables. This allows coaxial cable runs to be installed next to metal objects without the power losses that occur in other transmission lines, and provides protection of the communications signals from external electromagnetic interference.

Connectors for coaxial cables are typically connected onto complementary interface ports to electrically integrate coaxial cables to various electronic devices and cable communication equipment. Connection is often made through rotatable operation of an internally threaded nut of the connector about a corresponding externally threaded interface port. Fully tightening the threaded connection of the coaxial cable connector to the interface port helps to ensure a ground connection between the connector and the corresponding interface port.

Lack of continuous port grounding in a conventional threaded connector, for example, when the conventional threaded connector is loosely coupled with an interface port (i.e., when in a loose state relative to the interface port), introduces noise and ultimately performance degradation in conventional RF systems. Furthermore, lack of ground contact prior to the center conductor contacting the interface port may also introduce an undesirable "burst" of noise upon insertion of the center conductor into the interface port.

Accordingly, there is a need to overcome, or otherwise lessen the effects of, the disadvantages and shortcomings described above. Hence a need exists for a coaxial cable connector having improved grounding between the coaxial cable, the connector, and the coaxial cable connector interface port.

SUMMARY

According to various aspects of the disclosure, a coaxial cable connector including a body configured to be coupled with a prepared end of a coaxial cable, a post configured to engage the body and an outer conductor of the coaxial cable when the connector is installed on the coaxial cable, a nut rotatingly coupled to the post and having a forward end configured to be threadedly coupled with an interface port, and a sleeve surrounding the nut and extending forward from the nut in a direction opposite to the body. The sleeve has a forward portion that extends beyond the forward end of the nut by a length such that the sleeve is configured to contact an outer surface of the interface port before a center conductor of the coaxial cable contacts the interface port, and the sleeve is configured to align the connector with the port and to prevent the center conductor from contacting any portion of the interface port other than a center conductor contact portion of the interface port.

In some aspects of the connector, an inner surface of the forward portion of the sleeve that extends beyond the forward end of the nut has an inside diameter that is greater than an outside diameter of an outer surface of the nut over which the inner surface of the sleeve extends.

According to various aspects of the aforementioned connectors, an inside diameter of an inner surface of the forward portion is substantially constant along an entire length of the forward portion that extends beyond the forward end of the nut.

According to some aspects of the aforementioned connectors, an inside diameter of an inner surface along an entire length of the forward portion that extends beyond the forward end of the nut is greater than a largest inside diameter of an internal threading at the forward end of the nut.

According to various aspects of the aforementioned connectors, an inside diameter of an inner surface along an entire length of the forward portion that extends beyond the forward end of the nut is greater than a largest outside diameter of an outer surface of the interface port to which the connector is to be coupled.

According to some aspects of the aforementioned connectors, the sleeve is constructed from a material that is rigid such that the sleeve is configured to prevent axial compression and radial deflection of the sleeve when the connector is being coupled with the interface port.

According to various aspects of the aforementioned connectors, a forward end of the sleeve is configured to guide a center conductor of the cable into engagement with the center conductor contact portion of the interface port.

BRIEF DESCRIPTION OF THE DRAWINGS

Features and advantages of the present disclosure are described in, and will be apparent from, the following Brief Description of the Drawings and Detailed Description.

DETAILED DESCRIPTION OF EMBODIMENTS

The accompanying figures illustrate various exemplary embodiments of coaxial cable connectors that provide improved grounding between the coaxial cable, the connector, and the coaxial cable connector interface port. Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a", "an" and "the" include plural referents, unless the context clearly dictates otherwise.

Figure 1:
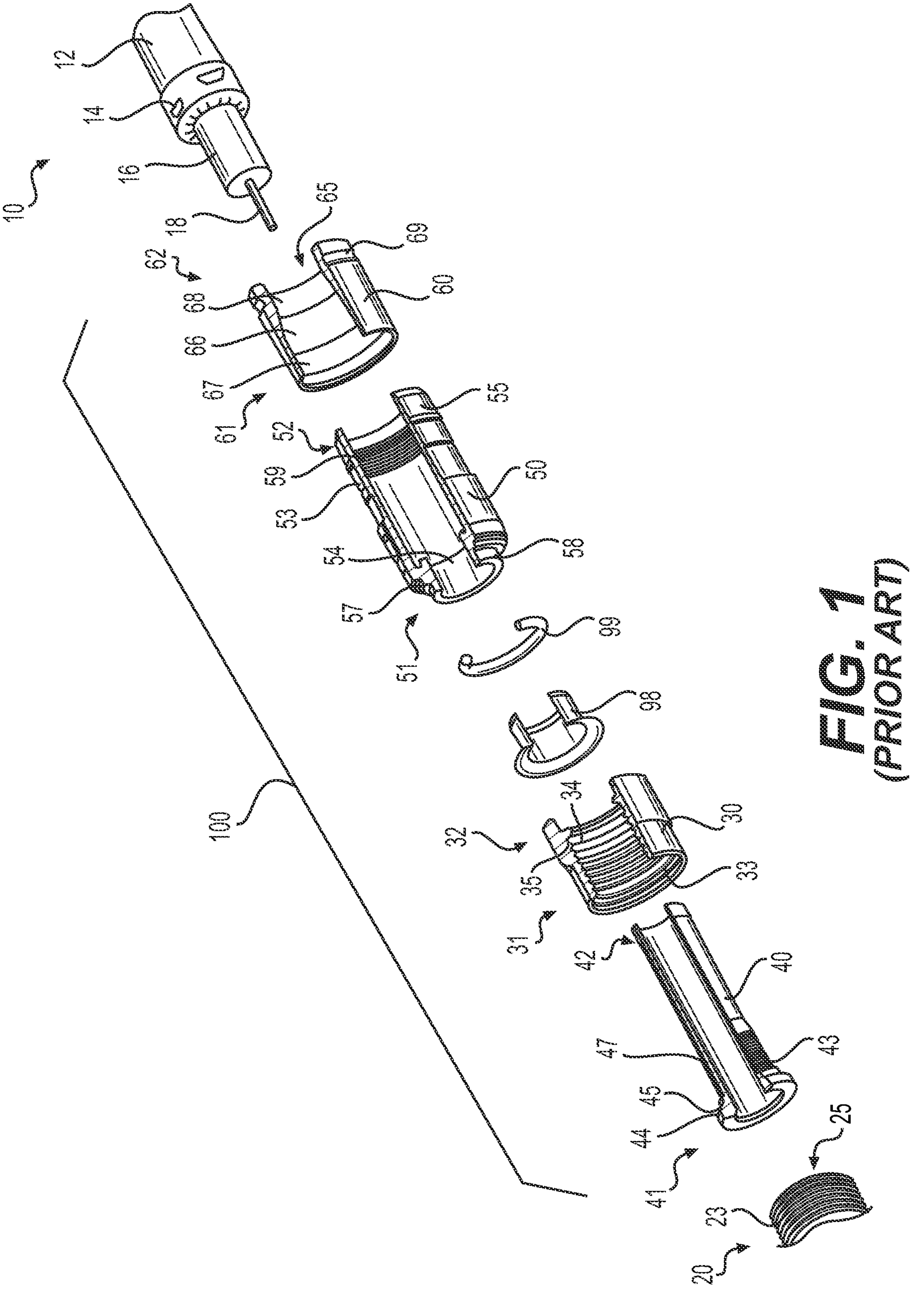
FIG. 1 (PRIOR ART)
FIG. 1 is an exploded perspective cut-away view of a conventional coaxial cable connector.

Referring to the drawings, FIG. 1 depicts a conventional coaxial cable connector 100. The coaxial cable connector 100 may be operably affixed, or otherwise functionally attached, to a coaxial cable 10 having a protective outer jacket 12, a conductive grounding shield 14, an interior dielectric 16 and a center conductor 18. The coaxial cable 10 may be prepared as embodied in FIG. 1 by removing the protective outer jacket 12 and drawing back the conductive grounding shield 14 to expose a portion of the interior dielectric 16. Further preparation of the embodied coaxial cable 10 may include stripping the dielectric 16 to expose a portion of the center conductor 18. The protective outer jacket 12 is intended to protect the various components of the coaxial cable 10 from damage which may result from exposure to dirt or moisture and from corrosion. Moreover, the protective outer jacket 12 may serve in some measure to secure the various components of the coaxial cable 10 in a contained cable design that protects the cable 10 from damage related to movement during cable installation. The conductive grounding shield 14 may be comprised of conductive materials suitable for providing an electrical ground connection, such as cuprous braided material, aluminum foils, thin metallic elements, or other like structures. Various embodiments of the shield 14 may be employed to screen unwanted noise. For instance, the shield 14 may comprise a metal foil wrapped around the dielectric 16, or several conductive strands formed in a continuous braid around the dielectric 16. Combinations of foil and/or braided strands may be utilized wherein the conductive shield 14 may comprise a foil layer, then a braided layer, and then a foil layer. Those in the art will appreciate that various layer combinations may be implemented in order for the conductive grounding shield 14 to effectuate an electromagnetic buffer helping to prevent ingress of environmental noise that may disrupt broadband communications. The dielectric 16 may be comprised of materials suitable for electrical insulation, such as plastic foam material, paper materials, rubber-like polymers, or other functional insulating materials. It should be noted that the various materials of which all the various components of the coaxial cable 10 are comprised should have some degree of elasticity allowing the cable 10 to flex or bend in accordance with traditional broadband communication standards, installation methods and/or equipment. It should further be recognized that the radial thickness of the coaxial cable 10, protective outer jacket 12, conductive grounding shield 14, interior dielectric 16 and/or center conductor 18 may vary based upon generally recognized parameters corresponding to broadband communication standards and/or equipment.

Referring further to FIG. 1, the connector 100 may be configured to be coupled with a coaxial cable interface port 20. The coaxial cable interface port 20 includes a center conductor contact portion 25 comprising a conductive receptacle for receiving a portion of the coaxial cable center conductor 18 sufficient to make adequate electrical contact, as would be understood by a person having ordinary skill in the art. The coaxial cable interface port 20 may further comprise a threaded exterior surface 23. It should be recognized that the radial thickness and/or the length of the coaxial cable interface port 20 and/or the conductive receptacle of the port 20 may vary based upon generally recognized parameters corresponding to broadband communication standards and/or equipment. Moreover, the pitch and height of threads which may be formed upon the threaded exterior surface 23 of the coaxial cable interface port 20 may also vary based upon generally recognized parameters corresponding to broadband communication standards and/or equipment. Furthermore, it should be noted that the interface port 20 may be formed of a single conductive material, multiple conductive materials, or may be configured with both conductive and non-conductive materials corresponding to the port's operable electrical interface with the connector 100. However, the receptacle of the port 20 should be formed of a conductive material, such as a metal, like brass, copper, or aluminum. Further still, it will be understood by those of ordinary skill that the interface port 20 may be embodied by a connective interface component of a coaxial cable communications device, a television, a modem, a computer port, a network receiver, or other communications modifying devices such as a signal splitter, a cable line extender, a cable network module and/or the like.

Referring still further to FIG. 1, the conventional coaxial cable connector 100 may include a coupler, for example, threaded nut 30, a post 40, a connector body 50, a fastener member 60, a grounding member 98 formed of conductive material, and a connector body sealing member 99, such as, for example, a body O-ring configured to fit around a portion of the connector body 50. The nut 30 at the front end of the post 40 serves to attach the connector 100 to an interface port.

The threaded nut 30 of the coaxial cable connector 100 has a first forward end 31 and opposing second rearward end 32. The threaded nut 30 may comprise internal threading 33 extending axially from the edge of first forward end 31 a distance sufficient to provide operably effective threadable contact with the external threads 23 of the standard coaxial cable interface port 20. The threaded nut 30 includes an internal lip 34, such as an annular protrusion, located proximate the second rearward end 32 of the nut. The internal lip 34 includes a surface 35 facing the first forward end 31 of the nut 30. The forward facing surface 35 of the lip 34 may be a tapered surface or side facing the first forward end 31 of the nut 30. The structural configuration of the nut 30 may vary according to differing connector design parameters to accommodate different functionality of a coaxial cable connector 100. For instance, the first forward end 31 of the nut 30 may include internal and/or external structures such as ridges, grooves, curves, detents, slots, openings, chamfers, or other structural features, etc., which may facilitate the operable joining of an environmental sealing member, such a water-tight seal or other attachable component element, that may help prevent ingress of environmental contaminants, such as moisture, oils, and dirt, at the first forward end 31 of a nut 30, when mated with the interface port 20. Moreover, the second rearward end 32 of the nut 30 may extend a significant axial distance to reside radially extent, or otherwise partially surround, a portion of the connector body 50, although the extended portion of the nut 30 need not contact the connector body 50. The threaded nut 30 may be formed of conductive materials, such as copper, brass, aluminum, or other metals or metal alloys, facilitating grounding through the nut 30. Accordingly, the nut 30 may be configured to extend an electromagnetic buffer by electrically contacting conductive surfaces of an interface port 20 when a connector 100 is advanced onto the port 20. In addition, the threaded nut 30 may be formed of both conductive and non-conductive materials. For example, the external surface of the nut 30 may be formed of a polymer, while the remainder of the nut 30 may be comprised of a metal or other conductive material. The threaded nut 30 may be formed of metals or polymers or other materials that would facilitate a rigidly formed nut body. Manufacture of the threaded nut 30 may include casting, extruding, cutting, knurling, turning, tapping, drilling, injection molding, blow molding, combinations thereof, or other fabrication methods that may provide efficient production of the component. The forward facing surface 35 of the nut 30 faces a flange 44 of the post 40 when operably assembled in a connector 100, so as to allow the nut to rotate with respect to the other component elements, such as the post 40 and the connector body 50, of the connector 100.

Referring still to FIG. 1, the connector 100 may include a post 40. The post 40 may include a first forward end 41 and an opposing second rearward end 42. Furthermore, the post 40 may include a flange 44, such as an externally extending annular protrusion, located at the first end 41 of the post 40. The flange 44 includes a rearward facing surface 45 that faces the forward facing surface 35 of the nut 30, when operably assembled in a coaxial cable connector 100, so as to allow the nut to rotate with respect to the other component elements, such as the post 40 and the connector body 50, of the connector 100. The rearward facing surface 45 of flange 44 may be a tapered surface facing the second rearward end 42 of the post 40. Further still, an embodiment of the post 40 may include a surface feature 47 such as a lip or protrusion that may engage a portion of a connector body 50 to secure axial movement of the post 40 relative to the connector body 50. However, the post need not include such a surface feature 47, and the coaxial cable connector 100 may rely on press-fitting and friction-fitting forces and/or other component structures having features and geometries to help retain the post 40 in secure location both axially and rotationally relative to the connector body 50. The location proximate or near where the connector body is secured relative to the post 40 may include surface features 43, such as ridges, grooves, protrusions, or knurling, which may enhance the secure attachment and locating of the post 40 with respect to the connector body 50. Moreover, the portion of the post 40 that contacts embodiments of a grounding member 98 may be of a different diameter than a portion of the nut 30 that contacts the connector body 50. Such diameter variance may facilitate assembly processes. For instance, various components having larger or smaller diameters can be readily press-fit or otherwise secured into connection with each other. Additionally, the post 40 may include a mating edge 46, which may be configured to make physical and electrical contact with a corresponding mating edge 26 of the interface port 20. The post 40 should be formed such that portions of a prepared coaxial cable 10 including the dielectric 16 and center conductor 18 may pass axially into the second end 42 and/or through a portion of the tube-like body of the post 40. Moreover, the post 40 should be dimensioned, or otherwise sized, such that the post 40 may be inserted into an end of the prepared coaxial cable 10, around the dielectric 16 and under the protective outer jacket 12 and conductive grounding shield 14. Accordingly, where an embodiment of the post 40 may be inserted into an end of the prepared coaxial cable 10 under the drawn back conductive grounding shield 14, substantial physical and/or electrical contact with the shield 14 may be accomplished thereby facilitating grounding through the post 40. The post 40 should be conductive and may be formed of metals or may be formed of other conductive materials that would facilitate a rigidly formed post body. In addition, the post may be formed of a combination of both conductive and non-conductive materials. For example, a metal coating or layer may be applied to a polymer of other non-conductive material. Manufacture of the post 40 may include casting, extruding, cutting, turning, drilling, knurling, injection molding, spraying, blow molding, component overmolding, combinations thereof, or other fabrication methods that may provide efficient production of the component.

The coaxial cable connector 100 may include a connector body 50. The connector body 50 may comprise a first end 51 and opposing second end 52. Moreover, the connector body may include a post mounting portion 57 proximate or otherwise near the first end 51 of the body 50, the post mounting portion 57 configured to securely locate the body relative to a portion of the outer surface of post 40, so that the connector body 50 is axially secured with respect to the post 40, in a manner that prevents the two components from moving with respect to each other in a direction parallel to the axis of the connector 100. The internal surface of the post mounting portion 57 may include an engagement feature 54 that facilitates the secure location of the grounding member 98 with respect to the connector body and/or the post 40, by physically engaging the grounding member 98 when assembled within the connector 100. The engagement feature 54 may simply be an annular detent or ridge having a different diameter than the rest of the post mounting portion 57. However other features such as grooves, ridges, protrusions, slots, holes, keyways, bumps, nubs, dimples, crests, rims, or other like structural features may be included to facilitate or possibly assist the positional retention of embodiments of the electrical grounding member 98 with respect to the connector body 50. Nevertheless, embodiments of the grounding member 98 may also reside in a secure position with respect to the connector body 50 simply through press-fitting and friction-fitting forces engendered by corresponding tolerances, when the various coaxial cable connector 100 components are operably assembled, or otherwise physically aligned and attached together. Various exemplary grounding members 98 are illustrated and described in U.S. Pat. No. 8,287,320, the disclosure of which is incorporated herein by reference. In addition, the connector body 50 may include an outer annular recess 58 located proximate or near the first end 51 of the connector body 50. Furthermore, the connector body 50 may include a semi-rigid, yet compliant outer surface 55, wherein an inner surface opposing the outer surface 55 may be configured to form an annular seal when the second end 52 is deformably compressed against a received coaxial cable 10 by operation of a fastener member 60. The connector body 50 may include an external annular detent 53 located proximate or close to the second end 52 of the connector body 50. Further still, the connector body 50 may include internal surface features 59, such as annular serrations formed near or proximate the internal surface of the second end 52 of the connector body 50 and configured to enhance frictional restraint and gripping of an inserted and received coaxial cable 10, through tooth-like interaction with the cable. The connector body 50 may be formed of materials such as plastics, polymers, bendable metals or composite materials that facilitate a semi-rigid, yet compliant outer surface 55. Further, the connector body 50 may be formed of conductive or non-conductive materials or a combination thereof. Manufacture of the connector body 50 may include casting, extruding, cutting, turning, drilling, knurling, injection molding, spraying, blow molding, component overmolding, combinations thereof, or other fabrication methods that may provide efficient production of the component.

With further reference to FIG. 1, the coaxial cable connector 100 may include a fastener member 60. The fastener member 60 may have a first end 61 and opposing second end 62. In addition, the fastener member 60 may include an internal annular protrusion 63 located proximate the first end 61 of the fastener member 60 and configured to mate and achieve purchase with the annular detent 53 on the outer surface 55 of connector body 50. Moreover, the fastener member 60 may comprise a central passageway 65 defined between the first end 61 and second end 62 and extending axially through the fastener member 60. The central passageway 65 may comprise a ramped surface 66 which may be positioned between a first opening or inner bore 67 having a first diameter positioned proximate with the first end 61 of the fastener member 60 and a second opening or inner bore 68 having a second diameter positioned proximate with the second end 62 of the fastener member 60. The ramped surface 66 may act to deformably compress the outer surface 55 of a connector body 50 when the fastener member 60 is operated to secure a coaxial cable 10. For example, the narrowing geometry will compress squeeze against the cable, when the fastener member is compressed into a tight and secured position on the connector body. Additionally, the fastener member 60 may comprise an exterior surface feature 69 positioned proximate with or close to the second end 62 of the fastener member 60. The surface feature 69 may facilitate gripping of the fastener member 60 during operation of the connector 100. Although the surface feature 69 is shown as an annular detent, it may have various shapes and sizes such as a ridge, notch, protrusion, knurling, or other friction or gripping type arrangements. The first end 61 of the fastener member 60 may extend an axial distance so that, when the fastener member 60 is compressed into sealing position on the coaxial cable 100, the fastener member 60 touches or resides substantially proximate significantly close to the nut 30. It should be recognized, by those skilled in the requisite art, that the fastener member 60 may be formed of rigid materials such as metals, hard plastics, polymers, composites and the like, and/or combinations thereof. Furthermore, the fastener member 60 may be manufactured via casting, extruding, cutting, turning, drilling, knurling, injection molding, spraying, blow molding, component overmolding, combinations thereof, or other fabrication methods that may provide efficient production of the component.

The manner in which the coaxial cable connector 100 may be fastened to a received coaxial cable 10 may also be similar to the way a cable is fastened to a common CMP-type connector having an insertable compression sleeve that is pushed into the connector body 50 to squeeze against and secure the cable 10. The coaxial cable connector 100 includes an outer connector body 50 having a first end 51 and a second end 52. The body 50 at least partially surrounds a tubular inner post 40. The tubular inner post 40 has a first end 41 including a flange 44 and a second end 42 configured to mate with a coaxial cable 10 and contact a portion of the outer conductive grounding shield or sheath 14 of the cable 10. The connector body 50 is secured relative to a portion of the tubular post 40 proximate or close to the first end 41 of the tubular post 40 and cooperates, or otherwise is functionally located in a radially spaced relationship with the inner post 40 to define an annular chamber with a rear opening. A tubular locking compression member may protrude axially into the annular chamber through its rear opening. The tubular locking compression member may be slidably coupled or otherwise movably affixed to the connector body 50 to compress into the connector body and retain the cable 10 and may be displaceable or movable axially or in the general direction of the axis of the connector 100 between a first open position (accommodating insertion of the tubular inner post 40 into a prepared cable 10 end to contact the grounding shield 14), and a second clamped position compressibly fixing the cable 10 within the chamber of the connector 100, because the compression sleeve is squeezed into retaining contact with the cable 10 within the connector body 50.

Figure 2:
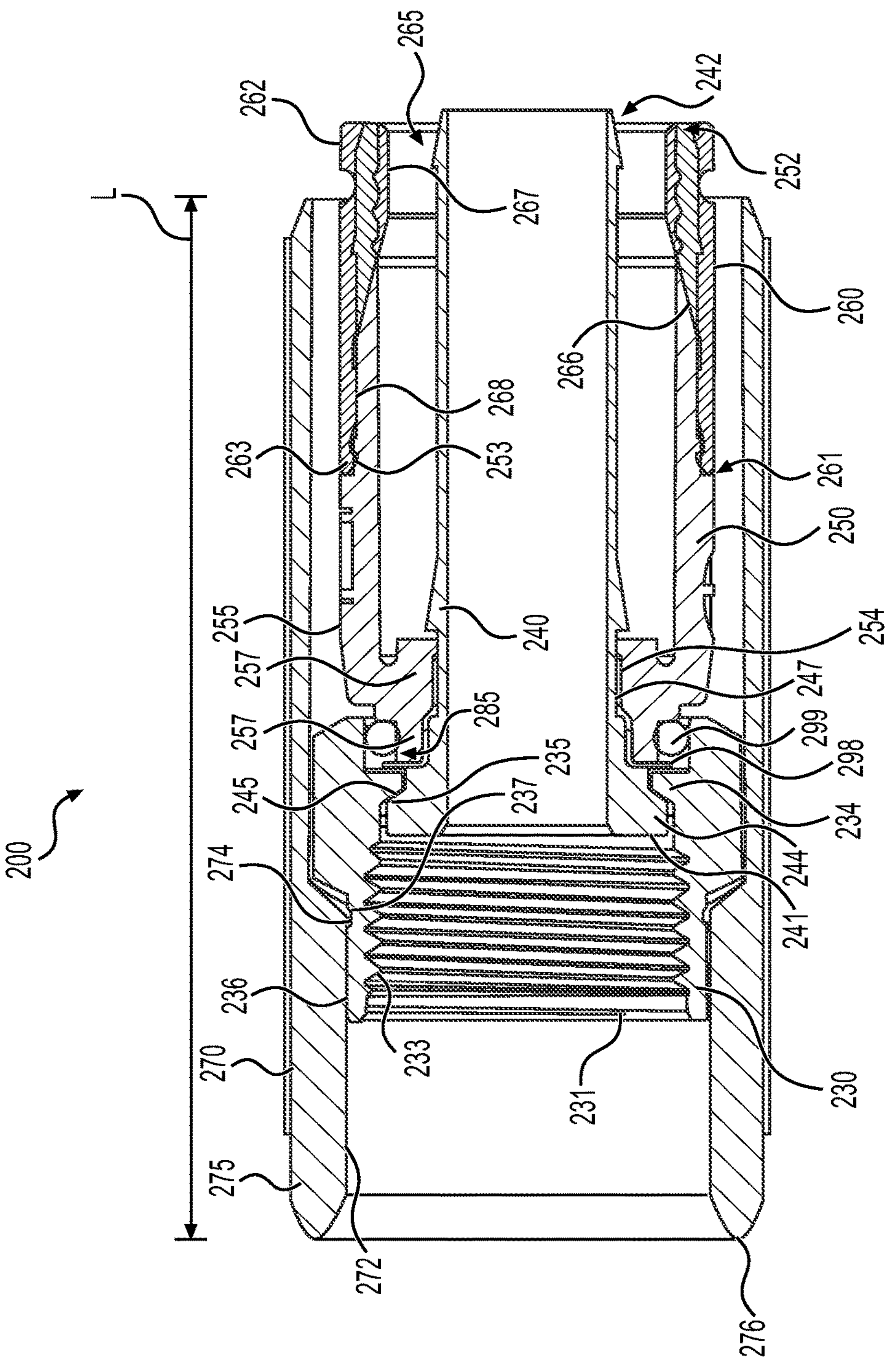
FIG. 2 is a side cross-sectional view of the exemplary coaxial cable connector according to various aspects of the disclosure.
Figure 3:
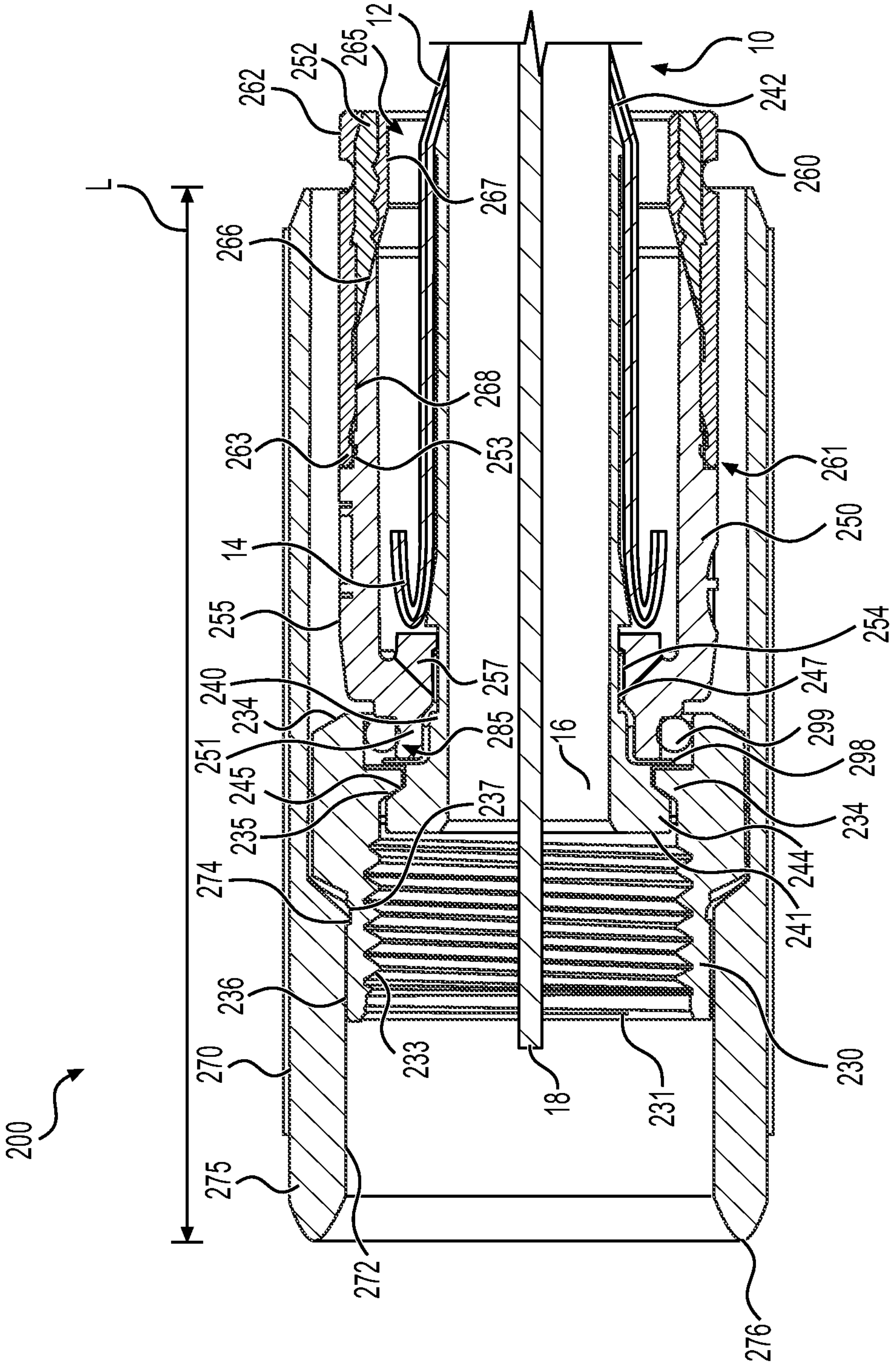
FIG. 3 is a side cross-sectional view of the exemplary coaxial cable connector of FIG. 2 attached to a prepared cable end.

As shown in FIGS. 2 and 3, an exemplary embodiment of the disclosure is directed to a coaxial connector 200, similar to the conventional coaxial connector 100 described above. The coaxial cable connector 200 may be operably affixed, or otherwise functionally attached, to a prepared end of a coaxial cable 10 having a protective outer jacket 12, a conductive grounding shield 14, an interior dielectric 16 and a center conductor 18, as shown in FIG. 3. The connector 200 is configured to be coupled with the coaxial cable interface port 20. The coaxial cable interface port 20 includes the center conductor contact portion 25 for receiving a portion of a coaxial cable center conductor 18 sufficient to make adequate electrical contact and the threaded exterior surface 23.

Referring to FIGS. 2 and 3, the coaxial cable connector 200 includes a coupler, for example, a threaded nut 230, a post 240, a connector body 250, and a sleeve 270. In some aspects, the connector 200 may also include a fastener member 260, a grounding member 298 formed of conductive material, and a connector body sealing member 299, such as, for example, a body O-ring configured to fit around a portion of the connector body 250. The nut 230 at the front end of the post 240 serves to attach the connector 200 to the interface port 20.

The threaded nut 230 of the coaxial cable connector 200 may include internal threading 233 extending axially from an edge of a first forward end 231 a distance sufficient to provide operably effective threadable contact with the external threads 23 of the standard coaxial cable interface port 20. The threaded nut 230 includes an internal lip 234, such as an annular protrusion, located proximate a second rearward end 232 of the nut 230. The internal lip 234 includes a surface 235 facing the first forward end 231 of the nut 230. Moreover, the second rearward end 232 of the nut 230 may extend a significant axial distance to reside radially extent, or otherwise partially surround, a portion of the connector body 250, although the extended portion of the nut 230 need not contact the connector body 250. The threaded nut 230 may be formed of conductive materials, such as copper, brass, aluminum, or other metals or metal alloys, facilitating grounding through the nut 230. Accordingly, the nut 230 may be configured to extend an electromagnetic buffer by electrically contacting conductive surfaces of an interface port 20 when a connector 200 is advanced onto the port 20. In addition, the threaded nut 230 may be formed of both conductive and non-conductive materials. The forward facing surface 235 of the nut 230 faces a flange 244 of the post 240 when operably assembled in the connector 200, so as to allow the nut 230 to rotate with respect to the other component elements, such as the post 240 and the connector body 250, of the connector 200.

The post 240 may include a first forward end 241 and an opposing second rearward end 242. The flange 244 may comprise an externally extending annular protrusion located at the first end 241 of the post 240. The flange 244 includes a rearward facing surface 245 that faces the forward facing surface 235 of the nut 230, when operably assembled in the coaxial cable connector 200, so as to allow the nut to rotate with respect to the other component elements, such as the post 240 and the connector body 250, of the connector 200. An embodiment of the post 240 may include a surface feature 247 such as a lip or protrusion that may engage a portion of a connector body 250 to secure axial movement of the post 240 relative to the connector body 250. The post 240 is formed such that portions of a prepared coaxial cable 10 including the dielectric 16 and center conductor 18 may pass axially into the second end 242 and/or through a portion of the tube-like body of the post 240. Moreover, the post 240 should be dimensioned, or otherwise sized, such that the post 240 may be inserted into an end of the prepared coaxial cable 10, around the dielectric 16 and under the protective outer jacket 12 and conductive grounding shield 14. Accordingly, where an embodiment of the post 240 is inserted into an end of the prepared coaxial cable 10 under the drawn back conductive grounding shield 14, substantial physical and/or electrical contact with the shield 14 may be accomplished thereby facilitating grounding through the post 240. The post 240 should be conductive and may be formed of metals or may be formed of other conductive materials that would facilitate a rigidly formed post body. In some aspects, the post may be formed of a combination of both conductive and non-conductive materials.

The connector body 250 includes a first end 251 and opposing second end 252. Moreover, the connector body 250 may include a post mounting portion 257 proximate or otherwise near the first end 251 of the body 250. The post mounting portion 257 is configured to securely locate the body 250 relative to a portion of the outer surface of post 240, so that the connector body 250 is axially secured with respect to the post 240, in a manner that prevents the two components from moving with respect to each other in a direction parallel to the axis of the connector 200. The internal surface of the post mounting portion 257 may include an engagement feature 254 that facilitates the secure location of the grounding member 298 with respect to the connector body 250 and/or the post 240, by physically engaging the grounding member 298 when assembled within the connector 200. In some embodiments, the grounding member 298 may reside in a secure position with respect to the connector body 250 simply through press-fitting and friction-fitting forces engendered by corresponding tolerances, when the various coaxial cable connector 200 components are operably assembled, or otherwise physically aligned and attached together. Various exemplary grounding members 298 are illustrated and described in U.S. Pat. No. 8,287,320, the disclosure of which is incorporated herein by reference.

In addition, the connector body 250 may include an outer annular recess 258 located proximate or near the first end 251 of the connector body 250. Furthermore, the connector body 250 may include a semi-rigid, yet compliant outer surface 255, wherein an inner surface opposing the outer surface 255 may be configured to form an annular seal when the second end 252 is deformably compressed against a received coaxial cable 10 by operation of the fastener member 260. The connector body 250 may be formed of conductive or non-conductive materials or a combination thereof.

The fastener member 260 may have a first end 261 and opposing second end 262. In addition, the fastener member 260 may include an internal annular protrusion 263 located proximate the first end 261 of the fastener member 260 and configured to mate and achieve purchase with an annular detent 253 on the outer surface 255 of connector body 250. Moreover, the fastener member 260 may comprise a central passageway 265 defined between the first end 261 and second end 262 and extending axially through the fastener member 260. The central passageway 265 may comprise a ramped surface 266 which may be positioned between a first opening or inner bore 267 having a first diameter positioned proximate with the first end 261 of the fastener member 260 and a second opening or inner bore 268 having a second diameter positioned proximate with the second end 262 of the fastener member 260. The ramped surface 266 may act to deformably compress the outer surface 255 of the connector body 250 when the fastener member 260 is operated to secure the coaxial cable 10.

The sleeve 270 extends about an outer periphery of the nut 230, thereby surrounding the nut 230. The sleeve 270 may be coupled with the nut 230 such that the sleeve 270 and the nut 230 are axially fixed with one another. For example, in some aspects, an inner surface 272 of the sleeve 270 may include an engagement structure 274 that is sized and arranged to engage a complementary engagement structure 237 on an outer surface 236 of the nut 230. In some embodiments, the engagement structure 274 of the sleeve 270 may be a radially inward projection, and the engagement structure 237 of the nut 230 may be an annular groove. In other embodiments, the engagement structure 274 of the sleeve 270 may be an annular groove, and the engagement structure 237 of the nut 230 may be a radially inward projection. It should be appreciated that any conventional engagement structures 237, 274 are contemplated by this disclosure.

The sleeve 270 has a forward portion 275 that extends beyond the forward end 231 of the nut 230. As shown in FIG. 3, the forward portion 275 of the sleeve 270 extends beyond the forward end 231 of the nut 230 such that a forward end 276 of the forward portion 275 of the sleeve 270 extends beyond the center conductor 18 of the coaxial cable 10 terminated by the connector 200. Thus, the sleeve 270 has an axial length L selected such that when the sleeve 270 is fixedly coupled with the nut 230 via the engagement structures 237, 274, the forward end 276 of the sleeve 270 extends beyond the center conductor 18 of the coaxial cable 10.

As shown in FIGS. 2 and 3, the inner surface 272 of the forward portion 275 of the sleeve 270 that extends beyond the forward end 231 of the nut 230 has an inside diameter that is greater than an outside diameter of the outer surface 236 of the nut 230 over which the inner surface 272 of the sleeve 270 extends. In some aspects, the inside diameter of the inner surface 272 of the forward portion 275 is substantially constant along its entire length that extends beyond the forward end 231 of the nut 230. The inside diameter of the inner surface 272 along its entire length that extends beyond the forward end 231 of the nut 230 is also greater than the largest inside diameter of the internal threading 233 at the forward end 231 of the nut 230. Thus, the inside diameter of the inner surface 272 along its entire length that extends beyond the forward end 231 of the nut 230 is also greater than the largest outside diameter of the outer surface 23 of the interface port 20.

The sleeve 270 is constructed from a material that is sufficiently rigid such that the sleeve 270 does not axially compress or radially deflect when the connector 200 is being coupled with the interface port 20. That is, when a technician attempts to couple the connector 200 with the interface port 20, if the forward end 276 of the sleeve 270 engages the interface port 20, the sleeve 270 does not axially compress or radially deflect, but instead is guided by the forward end 276 to a position such that the inner surface 272 of the sleeve 270 surrounds the outer surface 23 of the interface port 20 and wherein the center conductor 18 of the cable 10 is guided into engagement with the center conductor contact portion 25 of the interface port 20 and is prevented from contacting any portion of the interface port 20 other than the center conductor contact portion 25 of the interface port 20.

The sleeve 270 has a length L selected such that the forward end 276 of the forward portion 275 of the sleeve 270 is configured to contact the outer surface 23 of the interface port 20 before the center conductor 18 of the coaxial cable 10 terminated by the connector 200 is capable of contacting the interface port 20. By first contacting the outer surface 23 of the interface port 20, the sleeve 270 facilitates alignment of the connector 200 with the interface port 20 such that the center conductor 18 is guided into engagement with the center conductor contact portion 25 and is prevented from contacting any portion of the interface port 20 other than the center conductor contact portion 25 of the interface port 20. By first contacting the outer surface 23 of the interface port 20 and preventing misalignment of the center conductor 18 relative to the interface port 20, the sleeve 270 prevents an undesirable "burst" of noise in the communication network which could occur upon contact of the center conductor 18 with any surface of the interface port 20 other than the center conductor contact portion 25.

In some aspects, the sleeve 270 may also surround at least a portion of the connector body 50, as illustrated. It should be appreciated that the sleeve 270 may comprise a conductive material, a non-conductive material, or a combination thereof. The size and/or configuration of the sleeve 270 may also facilitate tightening of the connector 200 to the port 20 by a technician.

The accompanying figures illustrate various exemplary embodiments of coaxial cable connectors that provide improved grounding between the coaxial cable, the connector, and the coaxial cable connector interface port. Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

What is claimed is:

1. A coaxial cable connector comprising:

a body configured to be coupled with a prepared end of a coaxial cable;

a post configured to engage the body and an outer conductor of the coaxial cable when the connector is installed on the coaxial cable;

a nut rotatingly coupled to the post and having a forward end configured to be threadedly coupled with an interface port;

a sleeve surrounding the nut and extending forward from the nut in a direction opposite to the body;

wherein the sleeve has a forward portion that extends beyond the forward end of the nut by a length such that the sleeve is configured to contact an outer surface of the interface port before a center conductor of the coaxial cable contacts the interface port; and wherein the sleeve is constructed from a material that is rigid such that the sleeve is configured to prevent axial compression and radial deflection of the sleeve when the connector is being coupled with the interface port, thereby aligning the connector with the port and preventing the center conductor from contacting any portion of the interface port other than a center conductor contact portion of the interface port.

2. The coaxial cable connector of claim 1, wherein an inner surface of the forward portion of the sleeve that extends beyond the forward end of the nut has an inside diameter that is greater than an outside diameter of an outer surface of a portion of the nut surrounded by the sleeve.

3. The coaxial cable connector of claim 1, wherein an inside diameter of an inner surface of the forward portion is substantially constant along an entire length of the forward portion that extends beyond the forward end of the nut.

4. The coaxial cable connector of claim 1, wherein an inside diameter of an inner surface along an entire length of the forward portion that extends beyond the forward end of the nut is greater than a largest inside diameter of an internal threading at the forward end of the nut.

5. The coaxial cable connector of claim 1, wherein an inside diameter of an inner surface along an entire length of the forward portion that extends beyond the forward end of the nut is greater than a largest outside diameter of an outer surface of the interface port to which the connector is to be coupled.

6. The coaxial cable connector of claim 1, wherein a forward end of the sleeve is configured to guide a center conductor of the cable into engagement with the center conductor contact portion of the interface port.

7. A coaxial cable connector comprising:

a body configured to be coupled with a prepared end of a coaxial cable;

a nut configured to be coupled with the body and having a forward end configured to be threadedly coupled with an interface port;

a sleeve surrounding the nut and extending forward from the nut in a direction opposite to the body;

wherein the sleeve has a forward portion that extends beyond the forward end of the nut by a length such that the sleeve is configured to contact an outer surface of the interface port before a center conductor of the coaxial cable contacts the interface port; and wherein the sleeve is constructed from a material that is rigid such that the sleeve is configured to prevent axial compression and radial deflection of the sleeve when the connector is being coupled with the interface port, thereby aligning the connector with the port and preventing the center conductor from contacting any portion of the interface port other than a center conductor contact portion of the interface port.

8. The coaxial cable connector of claim 7, wherein an inner surface of the forward portion of the sleeve that extends beyond the forward end of the nut has an inside diameter that is greater than an outside diameter of an outer surface of a portion of the nut surrounded by the sleeve.

9. The coaxial cable connector of claim 7, wherein an inside diameter of an inner surface of the forward portion is substantially constant along an entire length of the forward portion that extends beyond the forward end of the nut.

10. The coaxial cable connector of claim 7, wherein an inside diameter of an inner surface along an entire length of the forward portion that extends beyond the forward end of the nut is greater than a largest inside diameter of an internal threading at the forward end of the nut.

11. The coaxial cable connector of claim 7, wherein an inside diameter of an inner surface along an entire length of the forward portion that extends beyond the forward end of the nut is greater than a largest outside diameter of an outer surface of the interface port to which the connector is to be coupled.

12. The coaxial cable connector of claim 7, wherein a forward end of the sleeve is configured to guide a center conductor of the cable into engagement with the center conductor contact portion of the interface port.

13. A coaxial cable connector comprising:
- a body configured to be coupled with a prepared end of a coaxial cable;
- a post configured to engage the body and an outer conductor of the coaxial cable;
- a nut coupled to the post and having a forward end configured to be coupled with an interface port;
- a sleeve surrounding the nut and extending forward from the nut;
- wherein the sleeve has a forward portion that extends beyond the forward end of the nut by a length such that the sleeve is configured to contact an outer surface of the interface port before a center conductor of the coaxial cable contacts the interface port; and
- wherein the sleeve is constructed from a material that is rigid such that the sleeve is configured to prevent axial compression and radial deflection of the sleeve when the connector is being coupled with the interface port, thereby aligning the connector with the port and preventing the center conductor from contacting any portion of the interface port other than a center conductor contact portion of the interface port.

14. The coaxial cable connector of claim 13, wherein an inner surface of the forward portion of the sleeve that extends beyond the forward end of the nut has an inside diameter that is greater than an outside diameter of an outer surface of a portion of the nut surrounded by the sleeve.

15. The coaxial cable connector of claim 13, wherein an inside diameter of an inner surface of the forward portion is substantially constant along an entire length of the forward portion that extends beyond the forward end of the nut.

16. The coaxial cable connector of claim 13, wherein an inside diameter of an inner surface along an entire length of the forward portion that extends beyond the forward end of the nut is greater than a largest inside diameter of an internal threading at the forward end of the nut.

17. The coaxial cable connector of claim 13, wherein an inside diameter of an inner surface along an entire length of the forward portion that extends beyond the forward end of the nut is greater than a largest outside diameter of an outer surface of the interface port to which the connector is to be coupled.

18. The coaxial cable connector of claim 13, wherein a forward end of the sleeve is configured to guide a center conductor of the cable into engagement with the center conductor contact portion of the interface port.

19. A coaxial cable connector comprising:
- a body configured to be coupled with a prepared end of a coaxial cable;
- a post configured to engage the body and an outer conductor of the coaxial cable when the connector is installed on the coaxial cable;
- a nut rotatingly coupled to the post and having a forward end configured to be threadedly coupled with an interface port;
- a sleeve surrounding the nut and extending forward from the nut in a direction opposite to the body;
- wherein the sleeve has a forward portion that extends beyond the forward end of the nut by a length such that the sleeve is configured to contact an outer surface of the interface port before a center conductor of the coaxial cable contacts the interface port;
- wherein the sleeve is constructed from a material that is rigid such that the sleeve is configured to prevent axial compression and radial deflection of the sleeve when the connector is being coupled with the interface port, thereby aligning the connector with the port and preventing the center conductor from contacting any portion of the interface port other than a center conductor contact portion of the interface port;
- wherein an inside diameter of an inner surface of the forward portion is substantially constant along an entire length of the forward portion that extends beyond the forward end of the nut and is greater than a largest outside diameter of an outer surface of the interface port to which the nut is to be threadedly coupled; and
- wherein an inside diameter of an inner surface along an entire length of the forward portion that extends beyond the forward end of the nut is greater than a largest inside diameter of an internal threading at the forward end of the nut.

20. The coaxial cable connector of claim 19, wherein an inner surface of the forward portion of the sleeve that extends beyond the forward end of the nut has an inside diameter that is greater than an outside diameter of an outer surface of a portion of the nut surrounded by the sleeve.

21. The coaxial cable connector of claim 19, wherein a forward end of the sleeve is configured to guide a center conductor of the cable into engagement with the center conductor contact portion of the interface port.

22. A coaxial cable connector comprising:
- a body portion configured to be coupled with a prepared end of a coaxial cable;
- a coupler portion configured to be coupled with the body portion and having a forward end portion that is configured to be threadedly coupled with an interface port;
- a sleeve portion;
- wherein the sleeve portion has a first portion that is configured to surround a portion of the coupler portion and a second portion that is configured to extend beyond the forward end portion of the coupler portion in a direction opposite to the body portion by a length such that the sleeve portion is configured to contact an outer surface portion of the interface port before a center conductor of the coaxial cable contacts a center conductor contact portion of the interface port; and
- wherein the sleeve portion is constructed from a material that is rigid such that the sleeve portion is configured to prevent axial compression and radial deflection of the sleeve portion when the connector is being coupled with the interface port so as to align the connector with the interface port and prevent the center conductor from contacting any portion of the interface port other than the center conductor contact portion of the interface port.

23. The coaxial cable connector of claim 22, wherein an inner surface portion of the forward portion of the sleeve portion that extends beyond the forward end portion of the coupler portion has an inside diameter that is greater than an outside diameter of an outer surface portion of the portion of the coupler portion surrounded by the sleeve portion.

24. The coaxial cable connector of claim 22, wherein an inside diameter of an inner surface portion of the forward portion is substantially constant along an entire length of the forward portion that extends beyond the forward end portion of the coupler portion.

25. The coaxial cable connector of claim 22, wherein an inside diameter of an inner surface portion along an entire length of the forward portion that extends beyond the forward end portion of the coupler portion is greater than a largest inside diameter of an internal threading at the forward end portion of the coupler portion.

26. The coaxial cable connector of claim 22, wherein an inside diameter of an inner surface portion along an entire length of the forward portion that extends beyond the forward end portion of the coupler portion is greater than a largest outside diameter of the outer surface portion of the interface port to which the connector is to be coupled.

27. The coaxial cable connector of claim 22, wherein the forward end portion of the sleeve portion is configured to guide a center conductor of the cable into engagement with the center conductor contact portion of the interface port.

28. A coaxial cable connector comprising:
- a coupler portion configured to be coupled with a body portion that is configured to be coupled with a prepared end of a coaxial cable;
- a port contact portion configured to encircle at least a portion of the coupler portion;
- wherein the coupler portion comprises a forward end portion that is configured to be threadedly coupled with an interface port;
- wherein the port contact portion has a first portion that is configured to surround a portion of the coupler portion and a second portion that is configured to extend beyond the forward end portion of the coupler portion in a direction opposite to the body portion by a length such that the port contact portion is configured to contact an outer surface portion of the interface port before a center conductor of the coaxial cable contacts a center conductor contact portion of the interface port; and
- wherein the port contact portion is constructed from a material that is rigid such that the port contact portion is configured to prevent axial compression and radial deflection of the port contact portion when the connector is being coupled with the interface port so as to align the connector with the interface port and prevent the center conductor from contacting any portion of the interface port other than the center conductor contact portion of the interface port, thereby preventing a burst of noise in a communication network.

29. The coaxial cable connector of claim 28, wherein an inner surface portion of the forward portion of the port contact portion that extends beyond the forward end portion of the coupler portion has an inside diameter that is greater than an outside diameter of an outer surface portion of the portion of the coupler portion surrounded by the port contact portion.

30. The coaxial cable connector of claim 28, wherein an inside diameter of an inner surface portion of the forward portion is substantially constant along an entire length of the forward portion that extends beyond the forward end portion of the coupler portion.

31. The coaxial cable connector of claim 28, wherein an inside diameter of an inner surface portion along an entire length of the forward portion that extends beyond the forward end portion of the coupler portion is greater than a largest inside diameter of an internal threading at the forward end portion of the coupler portion.

32. The coaxial cable connector of claim 28, wherein an inside diameter of an inner surface portion along an entire length of the forward portion that extends beyond the forward end portion of the coupler portion is greater than a largest outside diameter of the outer surface portion of the interface port to which the connector is to be coupled.

33. The coaxial cable connector of claim 28, wherein the forward end portion of the port contact portion is configured to guide a center conductor of the cable into engagement with the center conductor contact portion of the interface port.

* * * * *